United States Patent
Cramer et al.

(10) Patent No.: US 8,053,930 B2
(45) Date of Patent: Nov. 8, 2011

(54) SOLAR POWER PLANT

(75) Inventors: Guenther Cramer, Kassel (DE); Bernd Engel, Wolfenbuettel (DE); Frank Greizer, Kaufungen (DE); Joachim Laschinski, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 318 days.

(21) Appl. No.: 12/484,558

(22) Filed: Jun. 15, 2009

(65) Prior Publication Data

US 2009/0315404 A1    Dec. 24, 2009

(30) Foreign Application Priority Data

Jun. 19, 2008  (EP) .................................... 08011146

(51) Int. Cl.
  *H02J 3/00*   (2006.01)
  *H01F 30/12*  (2006.01)
  *H01F 38/38*  (2006.01)
(52) U.S. Cl. ......................................... 307/82; 323/361
(58) Field of Classification Search ............... 307/82; 323/361
See application file for complete search history.

(56) References Cited

U.S. PATENT DOCUMENTS

| 2002/0085325 A1 | 7/2002 | Suzui et al. |
| 2007/0179720 A1 | 8/2007 | Becker et al. |

FOREIGN PATENT DOCUMENTS

| DE | 202006008936 U1 | 8/2006 |
| EP | 1841050 A2 | 10/2007 |

*Primary Examiner* — Rexford Barnie
*Assistant Examiner* — Dru Parries
(74) *Attorney, Agent, or Firm* — Slater & Matsil, L.L.P.

(57) ABSTRACT

A solar power plant with a plurality of photovoltaic modules for generating a power to be fed in a multi-phase grid, several photovoltaic strings, which are allocated to different phases, being connected to a primary side of a mains transformer and at least one inverter for converting the direct voltage generated by the photovoltaic modules into an alternating mains voltage conforming to the grid being provided and said mains transformer being provided with a neutral conductor and with a grounded terminal, is intended to be improved in such a manner that the life of the photovoltaic modules, in particular in case of thin-film modules, is increased, allowing for high conversion efficiency of the inverters at low wiring costs. This is achieved in that an additional direct voltage source is inserted between the neutral conductor and ground in such a manner that the potential of the photovoltaic strings is displaced and that a bias voltage is set, which is different from zero volt.

11 Claims, 2 Drawing Sheets

SOLAR POWER PLANT

BACKGROUND OF THE INVENTION

The invention relates to a solar power plant having a plurality of photovoltaic modules for generating power to be fed into a multiphase grid, several photovoltaic strings allocated to different phases being connected to a primary side of a mains transformer and at least one inverter for converting the direct voltage generated in the photovoltaic modules into a grid-complying alternating grid voltage being provided and the mains transformer being provided with a neutral conductor and with a grounded terminal or with a grounded terminal only.

Big solar plants, which are referred to as solar power plants, consist of a plurality of solar modules or of photovoltaic modules and inverters. The photovoltaic modules acting as the generators are connected in series or in parallel to form what are referred to as strings. The inverters are wired so that they feed the grid via a joint mains transformer.

In principle, one-phase or multi-phase inverters can be utilized. Three-phase inverters are primarily used.

It is known to dispose one-phase inverters in such a manner that feeding occurs in any phase of a multi-phase mains transformer. For each phase, there is at least one inverter. The inverters are connected to the phases or to the conductors L1, L2, L3 through switches, in particular through contactors, and as a result thereof, to the primary side of the transformer. On the primary side, the transformer windings are star-connected. The midpoint is connected to the neutral conductor "N". The neutral conductor "N" is connected to ground (PE). The windings of the secondary side preferably have a triangular connection.

If a multi-phase inverter, more specifically a three-phase inverter, is used, the outputs of the inverter are connected to the conductors L1, L2, L3 via contactors.

Some photovoltaic modules, namely thin-film modules, must be operated in such a manner that a certain orientation of the field strength cannot occur at their cells. Otherwise, early damage may occur to these modules, resulting in a shorter life.

A known solution is to ground a terminal of the photovoltaic generator. As a result, the cells of the modules can only accept voltages having a polarity to ground.

The grounding of the modules however entails the use either of galvanically separating inverters or of transformerless inverters of certain topologies. Both inverter types must generate internally a missing polarity of the input voltage in order to be capable of feeding into the grid. This leads to a reduced conversion efficiency of these inverters.

By contrast, another solution is known from the document DE 20 2006 008 936 U1. It consists in that a certain potential is applied to a module terminal. There is provided a device through which the negative connection of a module is raised to a positive potential. This is intended to lengthen the life of the modules. The advantage of this device is that inverters of the most various topologies can be utilized.

If the solar plant is big and has many photovoltaic generators and inverters, a large number of such devices should be mounted, which is expensive though.

BRIEF SUMMARY OF THE INVENTION

It is the object of the invention to improve a solar power plant of the type mentioned herein above in such a manner that the life of the photovoltaic modules, in particular in the case of thin-film modules, may be increased, allowing for a high conversion efficiency of the inverters at low wiring cost.

In accordance with a variant, this object is solved in that, between the neutral conductor and ground, there is inserted an additional direct voltage source in such a manner that the potential of the photovoltaic strings is displaced and that a bias voltage different from zero volts is set in varied ways.

According to another variant, an additional direct voltage source is inserted in such a manner between one of the phases and ground that the potential of the photovoltaic strings is displaced and that a bias voltage different from zero volts is set in varied ways.

The solutions of the invention offer the advantage that disadvantageous orientation of the field strength is not possible and that damage to the modules is avoided.

The particular advantage of the invention is that photovoltaic generators may be utilized, which must be grounded for operation. The circuit arrangement of the invention may moreover be utilized with all the inverter topologies in large plants, which need a mains transformer of their own. Therefore, no special inverters must be utilized.

In accordance with the invention, a solar plant with at least one mains transformer is obtained, an additional direct voltage source being inserted between the neutral conductor (N) and the ground (PE), so that the potential of the one terminal of the photovoltaic string is set to a potential different from zero volts or greater than zero volts. This potential may also be a negative voltage though. Accordingly, the voltage must be different from zero volts. In height and polarity, the bias voltage adjusts to the desired potential of the photovoltaic string.

The invention moreover solves the grounding problem without the use of a galvanic isolating inverter or of a transformerless inverter of a certain circuit topology.

Using a three-phase inverter arrangement without a neutral conductor implementation, the direct voltage source can be inserted between one of the three phases L1, L2, L3 and PE. Using a three-phase inverter arrangement with a neutral conductor implementation, the direct voltage source is connected between the neutral conductor and PE. The midpoint of the transformer is connected to a neutral conductor. Again, the mains transformer is a multiphase transformer.

Other advantageous implementations of the invention are recited in the dependent claims.

In an advantageous development of the drive of the invention, there is provided that a current monitoring device of the additional direct voltage source for detecting a ground fault is connected. This allows for additionally monitoring a ground fault or a defective isolation at quite little expense in terms of circuitry, because the same current path, which leads to PE, can be used both for raising the potential and for measuring the current.

By biasing accordingly the mains midpoint, one may obtain a unipolar bias voltage of all the photovoltaic cells of the generator, even if they feed through a transformerless inverter. Accordingly, the use of highly efficient, transformerless inverters in high-performance photovoltaic plants is also possible using sensitive photovoltaic modules such as thin-film modules or modules with amorphous cells. It is therefore very advantageous if the photovoltaic modules are implemented as thin-film modules and if each inverter is implemented as a transformerless inverter.

In another preferred implementation of the invention, one inverter is utilized for each phase. The use of several one-phase inverters is beneficial when the power plant yields high power. One-phase inverters often have no galvanic isolation. The inverters are arranged such that feeding occurs in each phase of the multiphase transformer. For each phase, at least one inverter is provided. These inverters may be readily connected to the N conductor and to the PE conductor so that, in particular in the event of inverters having no galvanic isolation, no additional grounding of the modules is needed since they are grounded via the inverters.

If an additional mains transformer, which is located outside of an inverter housing, is connected, one multipolar switch or several switches may be connected in the connecting paths between inverter and mains transformer. By controlling the switches, the current flow can for example be interrupted in the event of a ground fault or in any other event. Advantageously, each inverter is thus connected to the transformer through switches, in particular through a contactor.

It must be distinguished whether the inverter arrangement has a neutral conductor on its output side or not. If there is no neutral conductor, a transformer without neutral conductor and having triangular connection is utilized on the primary side. Accordingly, either a primary side of the transformer is star-connected, a midpoint of the transformer being connected to a neutral conductor, or, alternatively, a primary side of the transformer has a triangular connection, the transformer being implemented without neutral conductor. Advantageously, the windings of a secondary side of the transformer always have a triangular connection.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
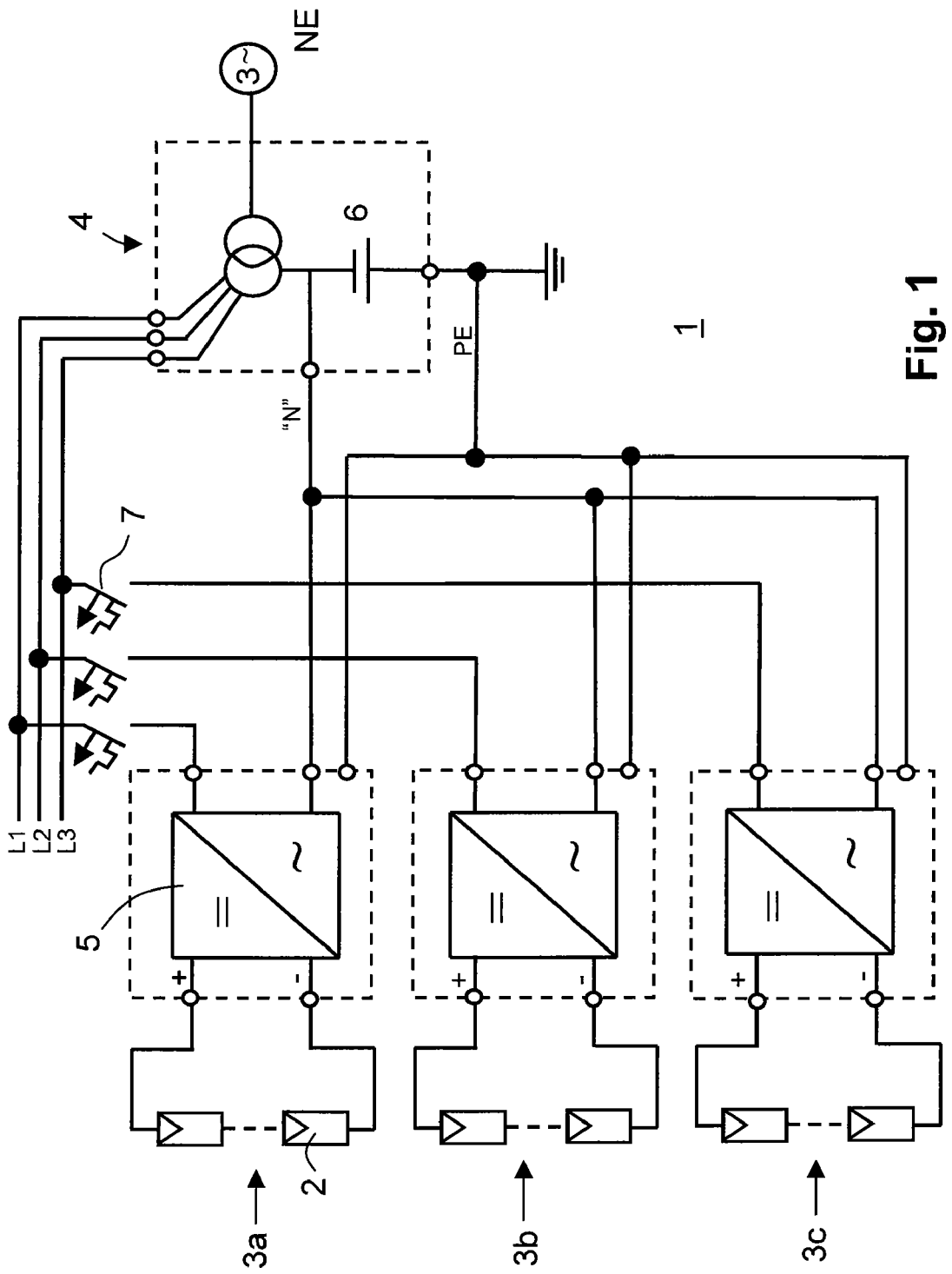
FIG. 1 is an illustration of a first embodiment of a solar power plant of the invention.

FIG. 1 shows a first embodiment of a solar power plant 1. The solar power plant incorporates a plurality of photovoltaic modules 2, in particular of thin-film modules for generating a power to be fed in a multiphase, in particular in a three-phase grid NE. Several photovoltaic strings 3a, 3b, 3c, which are allocated to different phases, are connected to a primary side of a mains transformer 4. Furthermore, there are provided several inverters 5, in particular transformerless inverters, for converting the direct voltage generated by the photovoltaic modules into a mains alternating voltage conforming to the grid. They may include boost and/or buck converters, a bridge circuit, a pulse-width control and/or an a maximum power point (MPP) control. The mains transformer 4 is provided with a neutral conductor N and with a grounded terminal PE.

The three one-phase inverters 5 are arranged such that feeding occurs in each phase of the three-phase mains transformer 4. For each phase, there is provided at least one inverter 5.

In accordance with the invention, an additional direct voltage source 6 is inserted between one of the phases L1, L2 and L3 and ground PE in such a manner that the potential of the photovoltaic strings 3a, 3b, 3c is displaced and that a bias voltage of greater than zero volts or different from zero volts is set. Through a corresponding bias voltage of the grid midpoint, one may obtain a unipolar bias voltage of all the photovoltaic cells, even if a transformerless inverter is being used.

In the current path of the direct voltage source, there is preferably connected a current monitoring device for detecting ground faults. In the event of an isolation or ground fault, a contactor 7 can then be enabled to interrupt the current connection between the inverters 5 and the mains transformer 4. An interruption between grid NE and transformer 4 is also possible. Accordingly, each inverter 5 is connected to the transformer 4 through switches.

In this variant, the one primary side of the transformer is star-connected, a midpoint of the transformer 4 being connected to the neutral conductor N.

Figure 2:
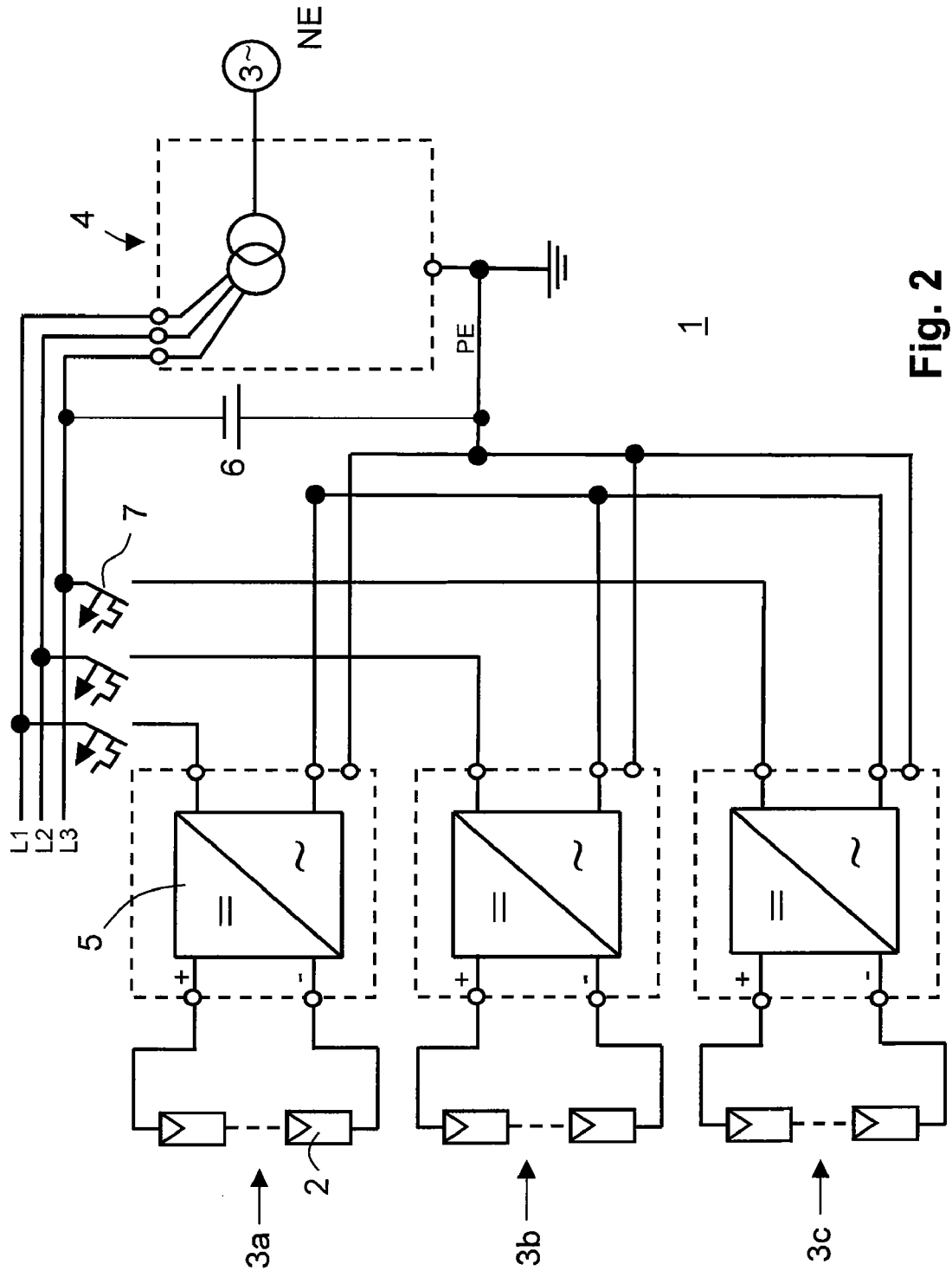
FIG. 2 is an illustration of a second embodiment of the solar power plant of the invention.

Another variant is possible, in which the transformer is configured without neutral conductor N, as illustrated in FIG. 2. The one primary side of the transformer hereby has a triangular connection. In accordance with the invention, the additional direct voltage source is then inserted between one of the phases or conductors L1, L2, L3 and ground PE, in such a manner that the potential of the photovoltaic strings is displaced and that a bias voltage is set, which is greater than zero volt.

In both variants, the windings of the secondary side of the transformer 4 have a triangular connection.

It is also possible to utilize a three-phase inverter the outputs WR of which are connected to the conductors L1, L2, L3 through switches or through one or several contactors.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A solar power plant with a plurality of photovoltaic modules for generating a power to be fed in a multi-phase grid, several photovoltaic strings, which are allocated to different phases, being connected to a primary side of a mains transformer and at least one inverter for converting the direct voltage generated by the photovoltaic modules into an alternating mains voltage conforming to the grid being provided and said mains transformer being provided with a grounded terminal, wherein an additional direct voltage source is inserted between one of the phases and ground in such a manner that the potential of the photovoltaic strings is displaced and that a bias voltage is set, which is different from zero volt.

2. A solar power plant having a plurality of photovoltaic modules for generating a power to be fed in a multi-phase grid, several photovoltaic strings, which are allocated to different phases, being connected to a primary side of a mains transformer and at least one inverter for converting the direct voltage generated by the photovoltaic modules into an alternating mains voltage conforming to the grid being provided and said mains transformer being provided with a neutral conductor and with a grounded terminal, wherein an additional direct voltage source is inserted between the neutral conductor and ground in such a manner that the potential of the photovoltaic strings is displaced and that a bias voltage is set which is different from zero volts.

3. The solar power plant as set forth in claim 2, wherein a current monitoring device of the additional direct voltage source for detecting ground faults is connected.

4. The solar power plant as set forth in claim 2, wherein the photovoltaic modules are configured to be thin-film modules.

5. The solar power plant as set forth in claim 2, wherein each inverter is implemented as a transformerless inverter.

6. The solar power plant as set forth in claim 2, wherein an inverter is utilized for each phase.

7. The solar power plant as set forth in claim 2, wherein each inverter is connected to the transformer via switches.

8. The solar power plant as set forth in claim 7, wherein at least one contactor is utilized as the switch.

9. The solar power plant as set forth in claim 2, wherein a primary side of the transformer is star-connected, a midpoint of the transformer being connected to a neutral conductor.

10. The solar power plant as set forth in claim 2, wherein a primary side of the transformer has a triangular connection, the transformer being implemented without neutral conductor.

11. The solar power plant as set forth in claim 2, wherein windings of a secondary side of the transformer have a triangular connection.

* * * * *